United States Patent Office

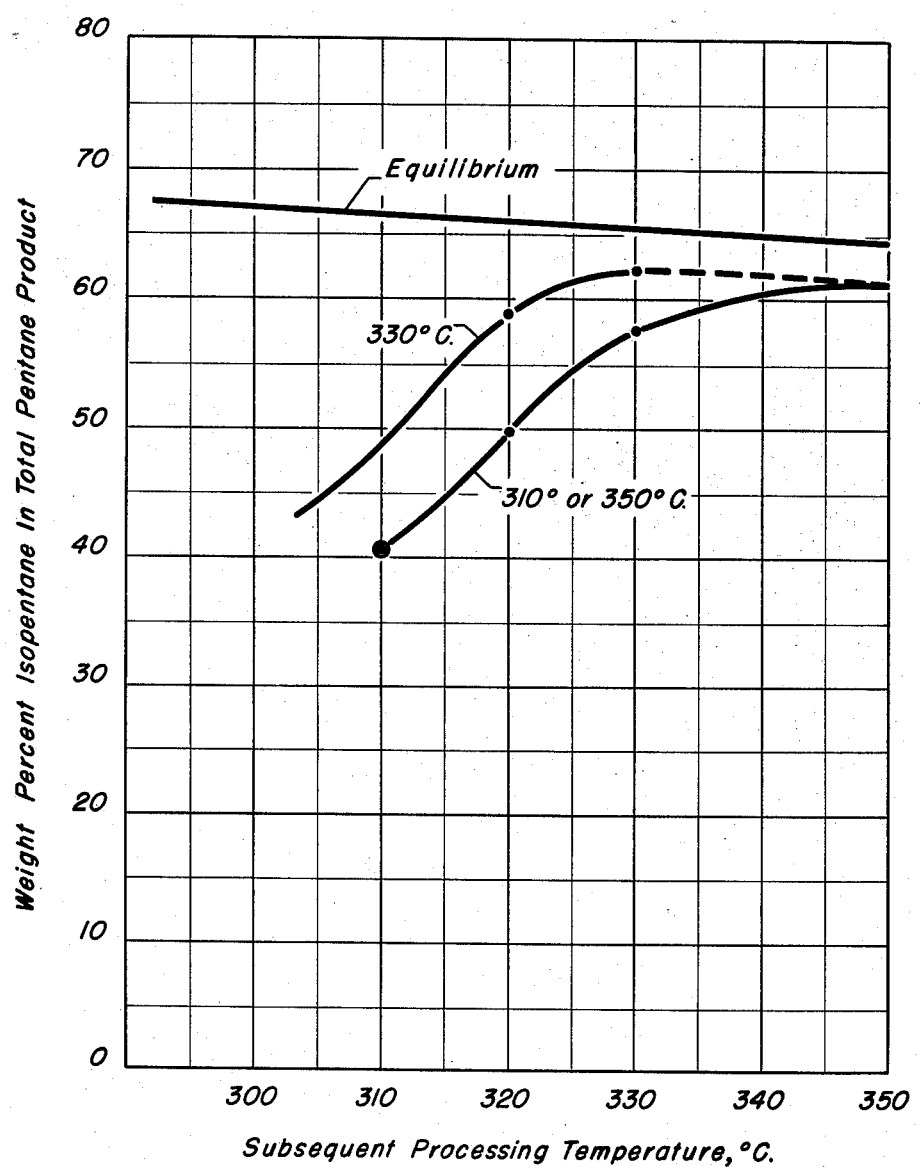

2,945,898
Patented July 19, 1960

2,945,898

HYDROISOMERIZATION PROCESS

George R. Donaldson, Barrington, Ill., assignor, by mesne assignments, to Universal Oil Products Company, Des Plaines, Ill., a corporation of Delaware Filed Dec. 11, 1958, Ser. No. 779,790

17 Claims. (Cl. 260—666)

This invention relates to the hydroisomerization of an isomerizable hydrocarbon and relates more particularly to a method of maximizing catalyst activity in such a process.

In recent years with the advances in the automotive industry, fuels of relatively high octane ratings have been found necessary. Many methods have been provided for the production of such high octane fuels. These methods include processes such as alkylation, catalytic reforming, catalytic cracking, and high temperature thermal cracking and thermal reforming operations. Other processes which may be considered in one sense auxiliary were developed, for example, isomerization, which was employed to produce isoparaffins which subsequently were reacted with olefins to form a high octane number motor fuel fraction. In addition to the production of one of the reactants for isoparaffin alkylation, isomerization was also utilized to increase the anti-knock quality of saturated hydrocarbons such as paraffins and/or naphthenes found in selected fractions of gasolines and naphthas. An example of the latter type of operation is a process in which pentane and/or hexane fractions are isomerized to produce isopentane and/or isomeric hexanes which subsequently may be employed as blending agents in automotive and aviation fuels.

In most of the above-mentioned isomerization processes, catalytic agents are employed to effect the desired molecular rearrangement. Ordinarily, these catalytic agents have consisted of metal halides, such as aluminum chloride, aluminum bromide, etc., which have been activated by the addition of the corresponding hydrogen halide. These catalytic agents are initially very active and effect high conversion per pass. However, the activity of these catalysts is so high that the catalysts accelerate decomposition reactions as well as isomerization reactions with the result that the ultimate yield of isomerized product is reduced. These decomposition reactions also considerably increase catalyst consumption by reaction of fragmental material with the catalytic agent to form sludge-like material. In spite of what might have been predicted, these decomposition and/or cracking reactions cannot be reduced by simply decreasing reaction zone severity as, for example, by lowering the reaction zone temperature or by increasing the space velocity of the reactants through the reaction zone. At temperatures and space velocities at which satisfactory isomerization reactions are obtained, these decomposition reactions are pronounced.

Recently, it has been disclosed that a catalyst comprising a refractory metal oxide, a platinum group metal, and from about 2.0% to about 5% by weight of combined fluorine can be utilized for the isomerization of hydrocarbons. This catalyst is particularly useful when the isomerization of hydrocarbons is carried out in the presence of added hydrogen. The term hydroisomerization has been applied to such processes for the molecular rearrangement of hydrocarbons in the presence of such a catalyst. A particularly preferred catalyst for the hydroisomerization of hydrocarbons in the presence of hydrogen is one which comprises alumina, platinum, and from about 2.0% to about 5.0% by weight of fluorine. In utilizing such a catalyst in a hydroisomerization process, it has unexpectedly been found that the relative catalyst activity can be raised substantially if the initial hydroisomerization processing of an isomerizable hydrocarbon is carried out within the temperature range of from about 320° C. to about 340° C. This and other features of the process of the present invention will be set forth hereinafter in detail.

In one embodiment, this invention relates to an improved process for the hydroisomerization of an isomerizable hydrocarbon in the presence of hydrogen and a catalyst comprising a refractory metal oxide, a platinum group metal, and from about 2.0 to about 5.0% by weight fluorine, the improvement which comprises initially hydroisomerizing said hydrocarbon within the temperature range of from about 320° C. to about 340° C.

In another embodiment, this invention relates to an improved process for the hydroisomerization of an isomerizable saturated hydrocarbon at hydroisomerization conditions in the presence of hydrogen and a catalyst comprising a refractory metal oxide, platinum, and from about 2.0% to about 5.0% by weight fluorine, the improvement which comprises initially hydroisomerizing said saturated hydrocarbon within the temperature range of from about 320° C. to about 340° C.

In a still further embodiment, this invention relates to an improved process for the hydroisomerization of an isomerizable paraffin hydrocarbon at hydroisomerization conditions in the presence of hydrogen and a catalyst comprising alumina, platinum, and from about 2.0 to about 5.0% by weight fluorine, the improvement which comprises initially hydroisomerizing said paraffin hydrocarbon within the temperature range of from about 320° C. to about 340° C.

In a specific embodiment, this invention relates to an improved process for the hydroisomerization of n-butane at hydroisomerization conditions in the presence of hydrogen and a catalyst comprising alumina, platinum, and from about 2.0% to about 5.0% by weight fluorine, the improvement which comprises initially hydroisomerizing said n-butane within the temperature range of from about 320° C. to about 340° C.

In another specific embodiment, this invention relates to an improved process for the hydroisomerization of n-pentane at hydroisomerization conditions in the presence of hydrogen and a catalyst comprising alumina, platinum, and from about 2.0 to about 5.0% by weight fluorine, the improvement which comprises initially hydroisomerizing said n-pentane within the temperature range of from about 320° C. to about 340° C.

In a still further specific embodiment, this invention relates to an improved process for the hydroisomerization of n-hexane at hydroisomerization conditions in the presence of hydrogen and a catalyst comprising alumina, platinum, and from about 2.0% to about 5.0% by weight fluorine, the improvement which comprises initially hydroisomerizing said n-hexane within the temperature range of from about 320° C. to about 340° C.

The process of this invention is particularly applicable to the hydroisomerization of isomerizable saturated hydrocarbons including paraffin hydrocarbons and cycloparaffin hydrocarbons and is still more particularly suitable for the hydroisomerization of straight chain or slightly branched chain paraffins containing four or more carbon atoms per molecule. Saturated hydrocarbons which are hydroisomerized in accordance with the process of this invention include n-butane, n-pentane, n-hexane, 2-methylpentane, 3-methylpentane, n-heptane, 2-methylhexane, 3-methylhexane, n-octane, etc., and cycloparaffins ordinarily containing at least five carbon atoms in the ring such as alkylcyclopentanes and cyclohexanes including methylcyclopentane, dimethylcyclopentane, cyclohexane, methylcyclohexane, dimethylcyclohexane, ethylcyclohexane, etc. The process is also applicable to the hydroisomerization of mixtures of paraffins and/or naphthenes such as those derived by selective fractionation of straight run or natural gasolines and naphthas. Such mixtures of paraffins and/or naphthenes include so-called pentane fractions, hexane fractions, etc., and mixtures thereof. The process of this invention is also applicable to the hydroisomerization of olefins, such as the hydroisomerization of 1-butene to 2-butene, the hydroisomerization of 3-methyl-1-butene to 2-methyl-2-butene, etc. The process of this invention may be used, in addition, for the hydroisomerization of alkyl aromatic hydrocarbons, for example, the hydroisomerization of ethylbenzene to dimethylbenzene or xylene, the hydroisomerization of propylbenzene to methylethylbenzene or trimethylbenzene, the hydroisomerization of a xylene isomer to an equilibrium mixture of xylene isomers, etc.

The catalyst used in the process of the present invention comprises a fractory metal oxide, a platinum group metal, and combined halogen, in which catalyst the combined halogen is fluorine and is present in an amount of from about 2.0% to about 5.0% by weight. The refractory metal oxide is a solid and may be selected from diverse refractory metal oxides which are not necessarily equivalent as supports. Among suitable refractory metal oxides are various substances such as alumina, titanium dioxide, zirconium dioxide, chromia, zinc oxide, silica, alumina, chromia alumina, alumina boria, silica zirconia, and various naturally occurring refractory metal oxides of various states of purity such as bauxite, kaoline or bentonite clay which may or may not have been acid treated, diatomaceous earth such as kieselguhr, montmorillonite, spinels such as magnesium oxide alumina spinels or zinc oxide spinels, etc. Of the above-mentioned refractory metal oxides, alumina is preferred and particularly preferred is synthetically prepared gamma alumina of a high degree of purity. In the present specification and appended claims, the term alumina is employed to mean porous aluminum oxide in all states of hydration, as well as aluminum hydroxide. The alumina may be synthetically prepared or naturally occurring and it may be of the crystalline or gel type. Whatever type of alumina is employed, it may be activated prior to use by one or more treatments including treatment with acids, alkalis, and other chemical compounds, drying, calcining, steam, etc. It may be in the form known as activated alumina, activated alumina of commerce, porous alumina, alumina gel, etc. The various forms of alumina are known by many trivial and trade names and it is intended to include all such forms. The typical aluminas hereinabove described are intended as illustrative rather than limiting on the scope of the present invention.

In the catalysts used in the process of the present invention, the above-mentioned refractory metal oxides have composited therewith a platinum group metal and from about 2.0% to about 5.0% by weight combined fluorine. By a platinum group metal is meant a noble metal, excluding silver and gold, and selected from the group consisting of platinum, palladium, ruthenium, rhodium, osmium, and iridium. These metals are not necessarily equivalent in activity in the catalysts utilized in the process of this invention, and of these metals, platinum and palladium are preferred, and platinum itself is particularly preferred. With the solid composite of refractory metal oxide and a platinum group metal for use as a catalyst in the process of the present invention is associated what is known in the art as combined fluorine, particularly from about 2.0% to about 5.0% by weight combined fluorine.

The preferred catalyst composition comprises alumina, platinum and from about 2.0% to about 5.0% by weight combined fluorine. As stated hereinabove, the alumina is preferably synthetically prepared gamma alumina and of a high degree of purity. The methods of preparation of such synthetically prepared gamma aluminas are well known. For example, they may be prepared by the calcination of alumina gels which are commonly formed by adding a suitable reagent such as ammonium hydroxide, ammonium carbonate, etc. to a solution of a salt of aluminum, such as aluminum chloride, aluminum sulfate, aluminum nitrate, etc., in an amount to form an aluminum hydroxide gel which on drying and calcination is converted to gamma alumina. It has been found that aluminum chloride is generally preferred as the aluminum salt, not only for convenience in subsequent washing and filtering procedures, but also because it appears to give the best results. Alumina gels may also be prepared by the reaction of sodium aluminate with a suitable acidic reagent to cause precipitation thereof with the resultant formation of an aluminum hydroxide gel. Synthetic aluminas may also be prepared by the reaction of metallic aluminum with hydrochloric acid, acetic acid, etc., to form alumina sols. These sols can be gelled with suitable precipitation agents such as ammonium hydroxide, followed by drying and calcination. The fluorine in an amount of from about 2.0% to about 5.0% by weight can be incorporated into the alumina in any suitable manner, for example, by the addition of a suitable quantity of hydrofluoric acid to the alumina sol or alumina gel prior to drying and calcination thereof. In another manner, aluminum fluoride in the desired amount can be added to alumina gels thus yielding an alumina having the desired quantity of fluorine combined therewith. In any of the above instances where the alumina is prepared from either an alumina sol or alumina gel, the resultant product is calcined to a sufficient temperature to convert the product into gamma alumina. While such resultant aluminas may contain relatively small amounts of water of hydration, gamma alumina containing from about 2.0% to about 5.0% by weight combined fluorine is the preferred synthetically prepared alumina containing combined fluorine for use in the preparation of the finished catalyst for use in the process of the present invention.

The preferred synthetically prepared alumina containing 2.0% to about 5.0% by weight combined fluorine, as hereinabove set forth, then has a platinum group metal combined therewith. This platinum group metal, particularly platinum, may be composited with the alumina in any of many well known methods. For example, an ammoniacal solution of chloroplatinic acid may be admixed with the fluorinated alumina followed by drying and reduction. In another method, chloroplatinic acid in the desired quantity can be added to an alumina gel slurry followed by the precipitation of the platinum therefrom by means of hydrogen sulfide or another sulfiding agent. In still another method, the platinum may be coprecipitated with the alumina gel, for example, by the introduction of a suitable platinum compound into an alumina sol followed by the addition of a precipitation agent thereto. In another method, chloroplatinic acid may be dissolved in dilute acid or mixed acid solutions, for example, in hydrochloric acid, nitric acid, sulfuric acid, a mixture of hydrochloric and nitric acids, etc., and these resultant solutions used for impregnation. While the amount of platinum compounded with the fluorinated alumina is not critical, for economic reasons, this amount of platinum is usually kept at a minimum. Thus, large amounts of platinum do not cause a detrimental effect. However, it is generally preferred to utilize from about 0.01% to about 2% by weight of platinum based on the dry alumina.

While the form of the finished catalytic composite is not critical, it is generally preferred to utilize macro size particles so that the total composite may be utilized as a fixed bed in a reaction zone. Thus, it is desirable to form the synthetically prepared alumina either before or after the platinum is composited therewith into particles, for example, of 1/16" x 1/16", or 1/8" x 1/8", etc. This can be accomplished in one manner by grinding the dried fluorinated alumina and pilling the resultant product with an organic binder such as stearic acid by known techniques followed by calcination. Alternately, the particles may be in the form of spheres from spray drying or dropping, or they may be in the form of irregularly shaped particles such as result from extrusion. While it is not meant to limit the invention to particles of any particular size, the above-mentioned composites are definitely preferred.

After the platinum in the desired concentration has been fixed on the alumina, the mixture is preferably dried at a temperature of from about 100° C. to about 200° C. for a period of time ranging from about 4 to about 24 hours. The catalyst may now be subjected to high temperature treatment, and this may consist of one or more methods. The preferred method is to subject the catalyst to calcination at a temperature of from about 425° C. to about 650° C. for a period of from about 2 to about 8 hours or more. Another method is to subject the catalyst to hydrogen or to hydrogen-containing gases at a temperature of from about 150° C. to about 300° C. for about 4 to about 12 hours or more, preferably followed by calcination at a temperature of from about 425° C. to about 650° C. In still another method, the catalyst may be subjected to reduction with hydrogen or hydrogen-containing gases at a temperature of from about 425° C. to about 650° C. for a period of from about 2 to about 10 hours or more.

The process of this invention is directed towards the hydroisomerization of an isomerizable hydrocarbon, and in particular, is directed towards the hydroisomerization of an isomerizable saturated hydrocarbon. As stated hereinabove, this hydroisomerization is characterized in one respect in that the process is carried out in a hydrogen atmosphere. While the use of hydrogen in processes of this general type as a cracking suppressor has been previously disclosed, it is felt that hydrogen pressure or partial pressure is an important variable in this process. A sufficient quantity of hydrogen should be utilized so that the hydrogen to hydrocarbon ratio of the combined reaction zone feed will be within the molar range of from about 0.5 to about 10. When smaller quantities of hydrogen are utilized, the catalyst rapidly deactivates, the desired hydroisomerization reactions decrease, and cracking reactions become prominent. The use of too much hydrogen is detrimental since the hydroisomerization reaction can be stopped completely by such means. The hydrogen can be supplied from any convenient source and will generally be recycled within the process so that hydrogen consumption will be, for all practical purposes, very small. The hydrogen utilized may be purified or may be diluted with various inert materials such as nitrogen, methane, ethane, and/or propane. Also, small amounts of sulfur in the feed stocks may be tolerated without harmful effects on the catalyst utilized herein.

As hereinabove set forth, the catalyst utilized in the process of this invention has high hydroisomerization activity with minimum cracking activity and is capable of catalyzing the hydroisomerization of hydrocarbons to equilibrium mixtures thereof under reaction conditions where high amounts of cracking have previously been observed when attempts have been made to utilize catalysts other than those now disclosed. Recently, processes have been proposed for the isomerization or hydroisomerization of pentane and/or hexane fractions utilizing noble metal containing catalyst. Such processes have been said to be extremely temperature sensitive. Thus, equilibrium mixtures of hydrocarbons are attained in such processes only with considerable loss in hydrocarbon charge thus making such processes undesirable from an economic standpoint. With the type of catalyst herein disclosed, hydroisomerization of hydrocarbons to equilibrium mixtures thereof can be attained at reaction zone conditions wherein such losses are minimized. Decomposition reactions, such as occur in prior art processes, cause rapid catalyst deactivation and thus necessitate either shutdown for catalyst change or catalyst regeneration. Use of the herein disclosed catalyst results in processes which can be operated for extended periods of time with minimum carbonization due to decomposition reactions. However, some carbon laydown, although small, has been noted. As a result thereof, it has been found desirable to maximize catalyst activity, thus allowing minimum severity of operating conditions. By the use of the process of the present invention in which the hydrocarbon to be hydroisomerized is initially processed in the presence of hydrogen over the catalyst at a temperature within the range of from about 320° C. to about 340° C., it has been found that the activity of these catalysts can be further increased so that milder processing conditions may be utilized. Such milder processing conditions allow operation for still greater extended periods of time, thus resulting in a still further economic advantage for this process in comparison to those described in the prior art.

As set forth hereinabove, initial processing of the isomerizable hydrocarbon is carried out at hydroisomerization conditions including specifically processing at a temperature within the range of from about 320° C. to about 340° C. When carrying out this initial processing within this temperature range, a pressure of from about 100 pounds per square inch to about 1500 pounds per square inch has been found to be satisfactory. Furthermore, the hourly liquid space velocity of the reactant, which hourly liquid space velocity is defined as the volume of hydrocarbon reactant (measured as liquid) per hour per volume of catalyst, will be maintained within the general range of from about 0.5 to about 100. The time for carrying out the initial processing can be varied although it has been found preferable to maintain the initial processing for a time of from about 1 to about 24 hours. The effect of the initial processing at the hereinabove set forth conditions will be described more specifically in the examples.

After the initial processing of the isomerizable hydrocarbon within the temperature range of from about 320° C. to about 340° C., the isomerizable hydrocarbon will be passed over the catalyst at a temperature range from about 250° C. to about 320° C., although temperatures within the more limited range of from about 275° C. to about 310° C. will generally be utilized. In some cases, it may be advantageous to carry out the processing at temperatures above those used initially, particularly, when a close approach to equilibrium is desired. Thus, the use of temperatures, after initial processing, of from about 250° C. to about 475° C. may prove advantageous in a specific application. Since catalyst activity has been maximized by the initial processing, the temperature within this broad range will be lower than would have been found to be necessary prior to this invention. The pressure utilized for the continual processing will be of the same magnitude as disclosed hereinabove for initial processing, that is, from about 100 pounds per square inch to about 1500 pounds per square inch.

As set forth hereinabove, the hydroisomerization process of the present invention utilizing the above described catalyst is particularly adapted for a so-called fixed bed type process. In such a process, the compound or compounds to be hydroisomerized are passed in either upward or downward flow over the catalyst and along with the requisite quantity of hydrogen. The reaction products are then separated from the hydrogen, which is recycled if desired, and the products may be subjected to fractionation and separation for recovery of the desired reaction products. Recovered starting material may be recycled so that the overall process yield is high. In the continued processing, the hourly liquid space velocities will again be maintained within the general range of from about 0.5 to about 100 and preferably within the range of from about 2.0 to about 20. Another means of effecting the hydroisomerization reaction of the present invention is to employ a fluidized fixed bed of catalyst wherein the reactant or reactants are passed upwardly through a bed of the catalytic material at a sufficient rate to maintain the individual particles of catalyst in a state of hindered settling. However, the rate of passage of the reactant through the bed is not so great as to suspend the catalytic material in the stream of hydroisomerizable compound and to carry it out of the reaction zone. As is readily apparent to one skilled in the art, smaller size particles than hereinabove described are more suitable for such a modified operation. If desired, the catalyst may be utilized in the form of so-called micro size particles and the process may be effected in a two-zone fluidized transfer process. In such a process, when it is desired to regenerate the catalyst or to reactivate it by other means, the catalytic material may be suspended in a gas stream and conveyed to a second zone in which it is contacted with the reactivating material, after which the reactivated catalyst is returned to the reaction zone where it may be utilized to effect further reactions. Another suitable two-zone system may be the use of a moving bed wherein a dense bed of the catalytic material slowly descends through the reaction zone, it is discharged from the lower portion thereof into a reactivation zone from which it is transported again to the top of a fixed bed in the reaction zone to again descend through the reaction zone effecting further reactions in transit. Regardless of the particular operation employed, catalyst activity will be maximized by initial processing within the specific temperature range set forth hereinabove. In any of the different methods of utilization of this process, the reaction products may be fractionated or otherwise separated to recover the desired reaction zone product and to separate unconverted material which may be recycled. Hydrogen in the effluent product likewise is separated and preferably is recycled.

The following examples were carried out in a bench scale apparatus. The reactor used consisted of a stainless steel tube of about 1" inside diameter, about 50" long (with a ¼" thermowell) placed in an electrically heated aluminum bronze block furnace. The upper section of the reactor consisted of a spirally grooved stainless steel preheat section while the space below the catalyst bed was filled with stainless steel spacers. The hydrocarbon was fed to the reactor using a pump at rates set forth hereinafter. The hydrogen charged to the reactor was supplied from a high pressure hydrogen cylinder and hydrogen was recycled within the unit. The hydrogen and hydrocarbon were introduced to the top of the reactor from which they flowed down through the preheat section, through the catalyst, and out of the reactor. The reaction products were condensed, cooled to room temperature, and a phase separation was effected in a high pressure receiver. The liquid product was collected, stabilized to remove low boiling hydrocarbons, and the desired boiling range reaction products were analyzed by vapor phase chromatographic techniques.

The following examples are introduced to illustrate further the novelty and utility of the process of the present invention but with no intention of unduly limiting the same. The examples are introduced further to illustrate the experiments carried out to obtain the data hereinafter described with reference to the drawing.

*Example I*

The catalyst utilized in this example and in the following examples for the hydroisomerization of n-pentane was prepared generally as set forth hereinabove. More specifically, the catalyst comprising platinum-fluorine-alumina was prepared by the general method of dissolving aluminum pellets in hydrochloric acid to form a sol containing about 15% aluminum. Sufficient hydrofluoric acid was added to the sol so that the catalyst prior to use contained 4.6% fluorine. The resultant sol was then mixed with hexamethylene tetramine in a continuous mixer and dropped into an oil bath maintained at about 90° C. to form spheres. The spheres were aged in the oil, and then in an aqueous solution of ammonia. The ammonium hydroxide washed spheres were then transferred to a drier, dried at about 250° C., and calcined at about 650° C. The synthetically prepared alumina spheres containing combined fluorine were impregnated with a dilute solution of chloroplatinic acid containing 1% HCl based on the dry alumina and 1% nitric acid based on the dry alumina. The amount of platinum in the solution was adjusted so that the final composite contained about 0.375% platinum by weight based on the dry alumina. The thus impregnated composite was then dried and calcined in air at a temperature of about 500° C. The finished catalyst contained 0.375% by weight platinum, about 4.5% by weight combined fluorine, and the remainder was alumina. Sufficient amount of this catalyst was prepared for use in the following experiments.

The experiment described in the example was carried out utilizing an initial processing temperature of 310° C. The charge stock utilized was approximately 100% n-pentane. After the catalyst, 75 cc., was placed as a fixed bed in the reaction zone and prior to use, it was pretreated with hydrogen at 0 p.s.i.g. and 550° C. for 4 hours. The hydrogen circulation rate was about 5.6 cubic feet per hour. With the reactor filled with hydrogen, hydrogen circulation was stopped and the pressure raised to 500 p.s.i.g. over a 1 hour period. At the expiration of this time, hydrogen circulation was again commenced at 500 p.s.i.g. and 550° C. This was continued for 5 hours while passing 3.12 cubic feet of hydrogen per hour over the catalyst. At the expiration of this period, with the reactor maintained at 500 p.s.i.g. while still circulating hydrogen, the temperature was dropped from 550° C. to 310° C. over a 4 hour period.

At this point, n-pentane was fed to the plant at the following conditions: 500 p.s.i.g., 310° C., 3.0 LHSV, and at a hydrogen to hydrocarbon molar ratio of about 2.0. This initial processing was continued for 20 hours at these conditions and then the catalyst activity was measured at three separate temperatures. At 310° C., the percent isopentane in the product was 40.5; at 320° C., the percent isopentane was 49.7; and at 330° C., the percent isopentane was 57.5. After use the catalyst was found to contain 0.1% carbon.

The activity points obtained at the temperatures of 310°, 320° and 330° C., after initial processing at 310° C., are plotted in the attached drawing and indicated as the 310° C. curve. It is noted that as the subsequent processing temperature is raised, catalyst activity increases towards equilibrium thus yielding a greater amount of isopentane in the product.

*Example II*

This example was carried out in a manner substantially the same as described in Example I, again utilizing n-pentane as the feed stock. The reactor was again filled with 75 cc. of catalyst, and pretreated with hydrogen at 0 p.s.i.g., and 550° C. for 4 hours time while circulating about 5 cubic feet per hour of hydrogen. Then, with the reactor filled with hydrogen, its circulation was stopped and the plant pressure raised to 500 p.s.i.g. over a 3 hour period. Hydrogen circulation was again started and continued at 500 p.s.i.g. and 550° C. for 5 hours maintaining a rate of 3 cubic feet per hour of hydrogen. At the end of this 5 hour period, while maintaining the pressure at 500 p.s.i.g. and hydrogen circulation at about 3 cubic feet per hour, the temperature was dropped from 550° to 330° C. over a 3 hour period.

At this point, the n-pentane feed stock was passed into the reactor at the following conditions: 500 p.s.i.g., 330° C., 3.0 LHSV, and 2.0 hydrogen to hydrocarbon molar ratio. A 30 hour initial processing was carried out at these conditions after which two 4 hour tests were carried out with intermediate line-out periods to obtain temperature vs. conversion data. These test periods show that at a processing temperature of 320° C., 58.8% isopentane was obtained in the product and that at 330° C., 62.0% isopentane was obtained in the product. The catalyst after use contained 0.04% carbon.

The conversion vs. subsequent processing temperature data obtained here is also plotted on the attached drawing as the 330° C. curve. The curve obtained is of the same general shape as that obtained when plotting the data from Example I. In Example I, the initial processing temperature was not within the critical range. Here in Example II, the initial processing temperature was within the critical range and the results show the activity of the catalyst was increased substantially. A more rapid approach to equilibrium is observed utilizing the process of the present invention. This results in an advantage which has been plotted here as one of temperature. For example, with subsequent processing at 320° C., a 9% higher yield of isopentane was observed in the product. This advantage could also be shown as one of space velocity so that by utilizing the process of the present invention, higher throughput at the same temperature could be obtained. Economically, these results are important since they mean that less B.t.u.'s need be furnished when utilizing the process of the invention, or that the size of the equipment can be decreased thus accomplishing overall savings in equipment cost.

Example III

This example was carried out in substantially the same manner as Examples I and II described hereinabove and further illustrates the process of the present invention by helping to establish an upper critical temperature limit through the use of which an initial processing maximum catalyst activity is obtained. Here again, the feed stock was n-pentane and another 75 cc. of the same catalyst was utilized. After placement of the catalyst in the reaction tube, it was pretreated with hydrogen at 0 p.s.i.g. while raising its temperature from 310° to 550° C. over a 4 hour period. The hydrogen circulation rate was about 5 cubic feet per hour. Next, the pressure of the reactor was raised to 500 p.s.i.g. at 550° C. over a 1 hour period while maintaining hydrogen circulation at about 3 cubic feet per hour. In the next hour period, 230 cc. of n-pentane was charged to the plant at 500 p.s.i.g., 550° C. and a hydrogen to hydrocarbon ratio of 2.0. At the end of this hour, the hydrocarbon feed was stopped and the temperature dropped to 350° C. at 500 p.s.i.g. over a 4 hour period while circulating about 3 cubic feet of hydrogen per hour.

Initial processing of the n-pentane was then carried out at 350° C., 550 p.s.i.g., about 3.0 LHSV, and a hydrogen to hydrocarbon molar ratio of about 2. The initial processing in this example was for a 2 hour period. Catalyst activity was then measured in two separate tests at 310° C. The conversion of n-pentane to isopentane in two separate tests was measured as 40.1% in the first and 40.5% in the second. After use, the catalyst contained 0.06% carbon.

The results of this example are again plotted on the attached drawing and fall exactly on the 310° C. initial processing curve. Since these points fall exactly on the same curve, it is assumed, and reasonably so, that the shape of the catalyst activity curve is the same as was obtained with a 310° C. initial processing of the catalyst. A combination of the results obtained and set forth in these three examples shows that maximum catalyst activity is obtained if initial processing is carried out within the specified temperature range of from about 320° to about 340° C.

I claim as my invention:

1. In a process for the hydroisomerization of an isomerizable hydrocarbon at hydroisomerization conditions in the presence of hydrogen and a catalyst comprising a refractory metal oxide, a platinum group metal, and from about 2.0 to about 5.0% by weight fluorine, the improvement which comprises initially hydroisomerizing said hydrocarbon within the temperature range of from about 320° C. to about 340° C. for a period of from about 1 to about 24 hours and thereafter continuing the hydroisomerization at a lower temperature in the range of from about 250° C. to about 320° C.

2. In a process for the hydroisomerization of an isomerizable saturated hydrocarbon at hydroisomerization conditions in the presence of hydrogen and a catalyst comprising a refractory metal oxide, a platinum group metal, and from about 2.0 to about 5.0% by weight fluorine, the improvement which comprises initially hydroisomerizing said saturated hydrocarbon within the temperature range of from about 320° C. to about 340° C. for a period of from about 1 to about 24 hours and thereafter continuing the hydroisomerization at a temperature of from about 275° C. to about 310° C.

3. In a process for the hydroisomerization of an isomerizable paraffin hydrocarbon at hydroisomerization conditions in the presence of hydrogen and a catalyst comprising a refractory metal oxide, a platinum group metal, and from about 2.0 to about 5.0% by weight fluorine, the improvement which comprises initially hydroisomerizing said paraffin hydrocarbon within the temperature range of from about 320° C. to about 340° C. for a period of from about 1 to about 24 hours and thereafter continuing the hydroisomerization at a lower temperature in the range of from about 250° C. to about 320° C.

4. In a process for the hydroisomerization of an isomerizable cycloparaffin hydrocarbon at hydroisomerization conditions in the presence of hydrogen and a catalyst comprising a refractory metal oxide, a platinum group metal, and from about 2.0 to about 5.0% by weight fluorine, the improvement which comprises initially hydroisomerizing said cycloparaffin hydrocarbon within the temperature range of from about 320° C. to about 340° C. for a period of from about 1 to about 24 hours and thereafter continuing the hydroisomerization at a lower temperature in the range of from about 250° C. to about 320° C.

5. In a process for the hydroisomerization of an isomerizable hydrocarbon at hydroisomerization conditions in the presence of hydrogen and a catalyst comprising a refractory metal oxide, platinum, and from about 2.0 to about 5.0% by weight of fluorine, the improvement which comprises initially hydroisomerizing said hydrocarbon within the temperature range of from about 320° C. to about 340° C. for a period of from about 1 to about 24 hours and thereafter continuing the hydroisomerization at a lower temperature in the range of from about 250° C. to about 320° C.

6. In a process for the hydroisomerization of an isomerizable saturated hydrocarbon at hydroisomerization conditions in the presence of hydrogen and a catalyst comprising a refractory metal oxide, platinum, and from about 2.0 to about 5.0% by weight fluorine, the improvement which comprises initially hydroisomerizing said saturated hydrocarbon within the temperature range of from about 320° C. to about 340° C. for a period of from about 1 to about 24 hours and thereafter continuing the hydroisomerization at a temperature of from about 275° C. to about 310° C.

7. In a process for the hydroisomerization of an isomerizable paraffin hydrocarbon at hydroisomerization conditions in the presence of hydrogen and a catalyst comprising a refractory metal oxide, platinum, and from about 2.0 to about 5.0% by weight fluorine, the improvement which comprises initially hydroisomerizing said paraffin hydrocarbon within the temperature range of from about 320° to about 340° C. for a period of from about 1 to about 24 hours and thereafter continuing the hydroisomerization at a lower temperature in the range of from about 250° C. to about 320° C.

8. In a process for the hydroisomerization of an isomerizable cycloparaffin hydrocarbon at hydroisomerization conditions in the presence of hydrogen and a catalyst comprising a refractory metal oxide, platinum, and from about 2.0 to about 5.0% by weight fluorine, the improvement which comprises initially hydroisomerizing said cycloparaffin hydrocarbon within the temperature range of from about 320° C. to about 340° C. for a period of from about 1 to about 24 hours and thereafter continuing the hydroisomerization at a lower temperature in the range of from about 250° C. to about 320° C.

9. In a process for the hydroisomerization of an isomerizable hydrocarbon at hydroisomerization conditions in the presence of hydrogen and a catalyst comprising alumina, platinum, and from about 2.0 to about 5.0% by weight fluorine, the improvement which comprises initially hydroisomerizing said hydrocarbon within the temperature range of from about 320° C. to about 340° C. for a period of from about 1 to about 24 hours and thereafter continuing the hydroisomerization at a lower temperature in the range of from about 250° C. to about 320° C.

10. In a process for the hydroisomerization of an isomerizable saturated hydrocarbon at hydroisomerization conditions in the presence of hydrogen and a catalyst comprising alumina, platinum, and from about 2.0 to about 5.0% by weight fluorine, the improvement which comprises initially hydroisomerizing said saturated hydrocarbon within the temperature range of from about 320° C. to about 340° C. for a period of from about 1 to about 24 hours and thereafter continuing the hydroisomerization at a temperature of from about 275° C. to about 310° C.

11. In a process for the hydroisomerization of an isomerizable paraffin hydrocarbon at hydroisomerization conditions in the presence of hydrogen and a catalyst comprising alumina, platinum, and from about 2.0 to about 5.0% by weight fluorine, the improvement which comprises initially hydroisomerizing said paraffin hydrocarbon within the temperature range of from about 320° C. to about 340° C. for a period of from about 1 to about 24 hours and thereafter continuing the hydroisomerization at a lower temperature in the range of from about 250° C. to about 320° C.

12. In a process for the hydroisomerization of an isomerizable cycloparaffin hydrocarbon at hydroisomerization conditions in the presence of hydrogen and a catalyst comprising alumina, platinum, and from about 2.0 to about 5.0% by weight of fluorine, the improvement which comprises initially hydroisomerizing said cycloparaffin hydrocarbon within the temperature range of from about 320° to about 340° C. for a period of from about 1 to about 24 hours and thereafter continuing the hydroisomerization at a lower temperature in the range of from about 250° C. to about 320° C.

13. In a process for the hydroisomerization of n-butane at hydroisomerization conditions in the presence of hydrogen and a catalyst comprising alumina, platinum, and from about 2.0 to about 5.0% by weight fluorine, the improvement which comprises initially hydroisomerizing said n-butane within the temperature range of from about 320° C. to about 340° C. for a period of from about 1 to about 24 hours and thereafter continuing the hydroisomerization at a lower temperature in the range of from about 250° C. to about 320° C.

14. In a process for the hydroisomerization of n-pentane at hydroisomerization conditions in the presence of hydrogen and a catalyst comprising alumina, platinum, and from about 2.0 to about 5.0% by weight fluorine, the improvement which comprises initially hydroisomerizing said n-pentane within the temperature range of from about 320° C. to about 340° C. for a period of from about 1 to about 24 hours and thereafter continuing the hydroisomerization at a lower temperature in the range of from about 250° C. to about 320° C.

15. In a process for the hydroisomerization of n-hexane at hydroisomerization conditions in the presence of hydrogen and a catalyst comprising alumina, platinum, and from about 2.0 to about 5.0% by weight fluorine, the improvement which comprises initially hydroisomerizing said n-hexane within the temperature range of from about 320° C. to about 340° C. for a period of from about 1 to about 24 hours and thereafter continuing the hydroisomerization at a lower temperature in the range of from about 250° C. to about 320° C.

16. In a process for the hydroisomerization of 2-methylpentane at hydroisomerization conditions in the presence of hydrogen and a catalyst comprising alumina, platinum, and from about 2.0 to about 5.0% by weight fluorine, the improvement which comprises initially hydroisomerizing said 2-methylpentane within the temperature range of from about 320° C. to about 340° C. for a period of from about 1 to about 24 hours and thereafter continuing the hydroisomerization at a lower temperature in the range of from about 250° C. to about 320° C.

17. In a process for the hydroisomerization of methylcyclopentane at hydroisomerization conditions in the presence of hydrogen and a catalyst comprising alumina, platinum, and from about 2.0 to about 5.0% by weight fluorine, the improvement which comprises initially hydroisomerizing said methylcyclopentane within the temperature range of from about 320° C. to about 340° C. for a period of from about 1 to about 24 hours and thereafter continuing the hydroisomerization at a lower temperature in the range of from about 250° C. to about 320° C.

References Cited in the file of this patent

UNITED STATES PATENTS

| | | |
|---|---|---|
| 2,798,105 | Heinemann et al. | July 2, 1957 |
| 2,831,908 | Starnes et al. | Apr. 22, 1958 |
| 2,834,823 | Patton et al. | May 13, 1958 |
| 2,841,626 | Holzman et al. | July 1, 1958 |